US009149881B2

(12) United States Patent
Ito et al.

(10) Patent No.: US 9,149,881 B2
(45) Date of Patent: Oct. 6, 2015

(54) DAMAGE-REPAIRING METHOD OF TRANSITION PIECE AND TRANSITION PIECE

(75) Inventors: Shoko Ito, Sagamihara (JP); Daizo Saito, Yokohama (JP); Yoshiaki Sakai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 856 days.

(21) Appl. No.: 13/355,105

(22) Filed: Jan. 20, 2012

(65) Prior Publication Data

US 2012/0186254 A1 Jul. 26, 2012

(30) Foreign Application Priority Data

Jan. 24, 2011 (JP) .................................. 2011-011858

(51) Int. Cl.
  *B23K 1/00* (2006.01)
  *F01D 5/00* (2006.01)
  *F01D 9/02* (2006.01)

(52) U.S. Cl.
  CPC .............. *B23K 1/0018* (2013.01); *F01D 5/005* (2013.01); *F01D 9/023* (2013.01); *B23K 2201/001* (2013.01); *F05D 2230/80* (2013.01)

(58) Field of Classification Search
  CPC ........ B23K 1/0018; F01D 9/023; F01D 5/005
  USPC ................... 60/798, 772, 752–760; 431/154; 228/248.1, 194, 233.2, 119, 111.5, 228/193, 195, 248.5, 234.1
  See application file for complete search history.

(56) References Cited

U.S. PATENT DOCUMENTS 6,530,971 B1   3/2003  Cohen et al.
7,094,450 B2   8/2006  Nagaraj et al.
(Continued)

FOREIGN PATENT DOCUMENTS

CA   2 368 329     7/2002
CN   2673569 Y    1/2005
(Continued)

OTHER PUBLICATIONS

The 1st Notice of Examination Comment issued by the State Intellectual Property Office of the People's Republic of China on Nov. 29, 2013, for Chinese Patent Application No. 201210018675, and English-language translation thereof.

(Continued)

*Primary Examiner* — Craig Kim
(74) *Attorney, Agent, or Firm* — Finnegan, Henderson, Farabow, Garrett & Dunner, L.L.P.

(57) ABSTRACT

A damage-repairing method of a transition piece in an embodiment includes; an oxide removing step of removing an oxide on an outer surface 20b of an inner duct 20 of a transition piece 10 having damage; a repair material placing step of placing a brazing repair material 80 on the outer surface 20b of the inner duct 20 so as to cover the damage; and a diffusion brazing step of diffusion heat treating the inner duct 20 to repair the damage formed in the outer surface 20b. The damage-repairing method of the transition piece includes: a pressurized heat treating step of, under high pressure, heat treating the inner duct 20; a surface finishing step of scraping off the brazing repair material 80 projecting from the outer surface 20b; and a non-pressurized heat treating step of solution heat treating and aging heat treating the inner duct 20 under non-pressure.

16 Claims, 9 Drawing Sheets

(56) References Cited

U.S. PATENT DOCUMENTS

| | | | |
|---|---|---|---|
| 7,216,485 B2* | 5/2007 | Caldwell et al. | 60/772 |
| 7,789,288 B1 | 9/2010 | Johnson et al. | |
| 2002/0157737 A1* | 10/2002 | Chesnes et al. | 148/528 |
| 2005/0191516 A1 | 9/2005 | Nagaraj et al. | |
| 2007/0039177 A1 | 2/2007 | Yoshioka et al. | |
| 2011/0088260 A1* | 4/2011 | Yoshioka et al. | 29/888 |

FOREIGN PATENT DOCUMENTS

| | | |
|---|---|---|
| CN | 1734061 | 2/2006 |
| CN | 1734061 A | 2/2006 |
| CN | 101987385 | 3/2011 |
| DE | 602 17 196 | 10/2007 |
| DE | 60 2005 006 353 | 6/2009 |
| DE | 10 2010 036 630 | 2/2011 |
| EP | 1 226 896 | 7/2002 |
| EP | 1 623 787 | 2/2006 |
| JP | 2002-301589 | 10/2002 |
| JP | 2003-90229 | 3/2003 |
| JP | 2003-176727 | 6/2003 |
| JP | 2004-190602 | 7/2004 |
| JP | 2004-332113 | 11/2004 |
| JP | 2005-146920 | 6/2005 |
| JP | 2005-342857 | 12/2005 |
| JP | 2006-46147 | 2/2006 |
| JP | 2009-191840 | 8/2009 |
| JP | 2009-285664 | 12/2009 |
| JP | 2011-33028 | 2/2011 |

OTHER PUBLICATIONS

Invitation to Respond to Written Opinion issued by the Intellectual Property Office of Singapore on May 15, 2013, for Singapore Patent Application No. 201200423-0.

* cited by examiner

DAMAGE-REPAIRING METHOD OF TRANSITION PIECE AND TRANSITION PIECE

CROSS-REFERENCE TO RELATED APPLICATIONS

This application is based upon and claims the benefit of priority from the prior Japanese Patent Application No. 2011-011858, filed on Jan. 24, 2011; the entire contents of which are incorporated herein by reference.

FIELD

Embodiments described herein relate generally to a damage-repairing method of a transition piece of a gas turbine, and a transition piece repaired by the above damage-repairing method.

BACKGROUND

In a gas turbine power generating plant, compressed air compressed by driving of a compressor provided coaxially with a gas turbine and fuel are introduced into a combustor to be burnt in a combustion chamber in a combustor liner. A high-temperature combustion gas generated by the combustion is introduced into a turbine part composed of stator blades and rotor blades through a transition piece to be expanded to thereby rotationally drive the rotor blades. In the gas turbine power generating plant, by using kinetic energy created by the rotational driving, a power generator, and so on are rotationally driven to perform power generation.

A conventional transition piece has a double-shell structure composed of an inner duct and an outer duct provided around an outer periphery of the inner duct. One end of the inner duct is coupled to a combustor liner in a cylindrical shape, and the other end of the inner duct is coupled to a stator blade at a first stage of a turbine. Thus, the shape of a cross section, of a combustion gas channel in the inner duct, perpendicular to a flowing direction of a combustion gas changes from a circular shape to a sector of annular shape. The outer duct is also formed into a shape corresponding to the shape of the inner duct.

The inner duct has the high-temperature combustion gas flow through the inside thereof, and thus is formed of a Ni-base superalloy, and further has a cooling structure. In the outer duct in the transition piece of a typical gas turbine on order of 1300° C., a plurality of impingement cooling holes through which part of air discharged from the compressor is ejected and made to impinge onto/on an outer surface of the inner duct as cooling air are formed over the entire surface.

As above, the inner duct of the conventional transition piece is formed of a Ni-base superalloy, and is cooled by the cooling air. However, when a base material increases in temperature locally while the gas turbine is in operation, damage such as reduction in thickness due to oxidation or the like, cracks due to thermal fatigue, and creep voids and cracks due to creep damage is thereby caused in the inner duct.

The above damage is repaired by welding or the like at the time of periodical inspection, and the repaired transition piece is used continuously. However, as its continuous employment time is prolonged, a range of the damage tends to spread. The creep voids due to material deterioration are formed over a large area, and are found even in the inside of the base material, for example.

In the case when repairing is performed over a large area, a local heat input amount increases in the weld repairing. Thus, deformation of the inner duct of the transition piece having a thin thickness structure is caused to make the repairing impossible to be performed, and thus the transition piece is sometimes disposed of. Further, with respect to the creep voids in the base material, it is not possible to pinpoint a range where the creep voids are generated, and the transition piece is employed in a state where the creep voids remain in the base material, thus being at high risk of being led to destruction.

The reduction in thickness due to high-temperature oxidation progresses in proportion to an employment period of the transition piece. Then, when the thickness of the inner duct of the transition piece falls below an allowable thickness, the transition piece has a possibility to be led to destruction. With respect to the reduction in thickness, a thickness-reduced portion can be built-up by welding, but an area to be welded is increased, and thus deformation is caused.

In order to avoid problems such as the deformation in the above-described weld repairing, repairing by diffusion brazing is also considered.

The above-described conventional repairing by diffusion brazing, as compared to the weld repairing, can avoid the problems such as the deformation of the base material, but has a difficulty in being applied to large area repairing for, for example, the reduction in thickness, creep void, and so on.

DETAILED DESCRIPTION

In one embodiment, in a damage-repairing method of a transition piece, damage caused in a transition piece is repaired. The above damage-repairing method of the transition piece includes: an oxide removing step of removing an oxide on an outer surface of the transition piece having damage; a repair material placing step of placing a brazing repair material on the outer surface, from which the oxide has been removed, of the transition piece so as to cover the damage; and a diffusion brazing step of diffusion heat treating the transition piece with the brazing repair material placed thereon and melting the brazing repair material to repair the damage formed in the outer surface.

The damage-repairing method of the transition piece further includes: a pressurized heat treating step of, under high pressure, heat treating the transition piece of which the damage formed in the outer surface has been repaired; a surface finishing step of scraping off the brazing repair material projecting from the outer surface of the pressurized heat treated transition piece; and a non-pressurized heat treating step of, under non-pressure, solution heat treating and aging heat treating the surface finished transition piece.

Hereinafter, embodiments of the present invention will be explained with reference to the drawings.

First Embodiment

Figure 1:
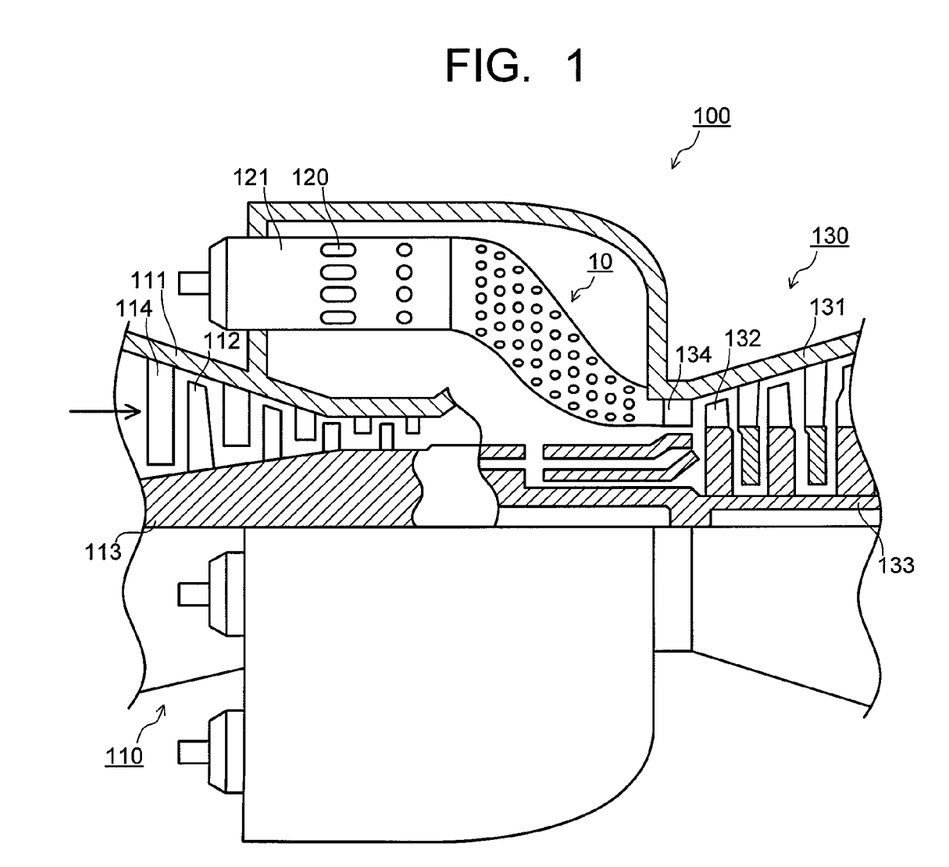
FIG. 1 is a view showing a structure of a gas turbine provided with a transition piece having a damage-repairing method of a transition piece in a first embodiment according to the present invention applied thereto, with a partial cross section.

FIG. 1 is a view showing a structure of a gas turbine 100 provided with a transition piece 10 having a damage-repairing method of a transition piece in a first embodiment according to the present invention applied thereto, with a partial cross section.

As shown in FIG. 1, the gas turbine 100 is provided with a compressor 110 in which the outside air is compressed and a combustor liner 120 in which air to which pressure is applied in the compressor 110 and fuel are mixed to be burnt. The gas turbine 100 is further provided with the transition piece 10 through which a combustion gas generated in the combustor liner 120 is led to a turbine part 130 and the turbine part 130 that is rotationally driven by the combustion gas introduced by the transition piece 10.

The compressor 110 is provided with, in a compressor casing 111, a compressor rotor 113 having rotor blades 112 implanted thereon. A plurality of the rotor blades 112 are implanted in a circumferential direction to form a rotor blade cascade with a plurality of stages in an axial direction. Further, a plurality of stator blades 114 are disposed on an inner periphery of the compressor casing 111 to form a stator blade cascade. Then, the stator blade cascade and the rotor blade cascade are formed alternately in the axial direction. When the rotor blades 112 rotate, the outside air is thereby compressed to be led into the gas turbine 100.

The combustor liner 120 is formed of a can-type combustor, for example, and a plurality of the combustor liners 120 are equally provided around the periphery of the compressor 110. In each of the combustor liners 120, the air to which pressure is applied in the compressor and the fuel are mixed to be burnt, and thereby the combustion gas is generated.

The transition piece 10, which will be described in detail later, is connected to an outlet side end portion of the combustor liner 120, and through the transition piece 10, the combustion gas from the combustor liner 120 is led to the turbine part 130 while the flow of combustion gas is adjusted.

The turbine part 130 is provided with, in a turbine casing 131, a turbine rotor 133 having rotor blades 132 implanted thereon. A plurality of the rotor blades 132 are implanted in the circumferential direction to form a rotor blade cascade with a plurality of stages in the axial direction. Further, on an inner periphery of the turbine casing 131, a plurality of stator blades 134 are disposed to form a stator blade cascade. Then, the stator blade cascade and the rotor blade cascade are formed alternately in the axial direction. The combustion gas introduced into the turbine part 130 is ejected onto the rotor blades 132 via the stator blades 134, and thereby the rotor blades 132 and the turbine rotor 133 rotate. Then, in a power generator (not-shown) coupled to the turbine rotor 133, rotational energy is converted into electric energy.

Next, the transition piece 10 will be explained.

Figure 2:
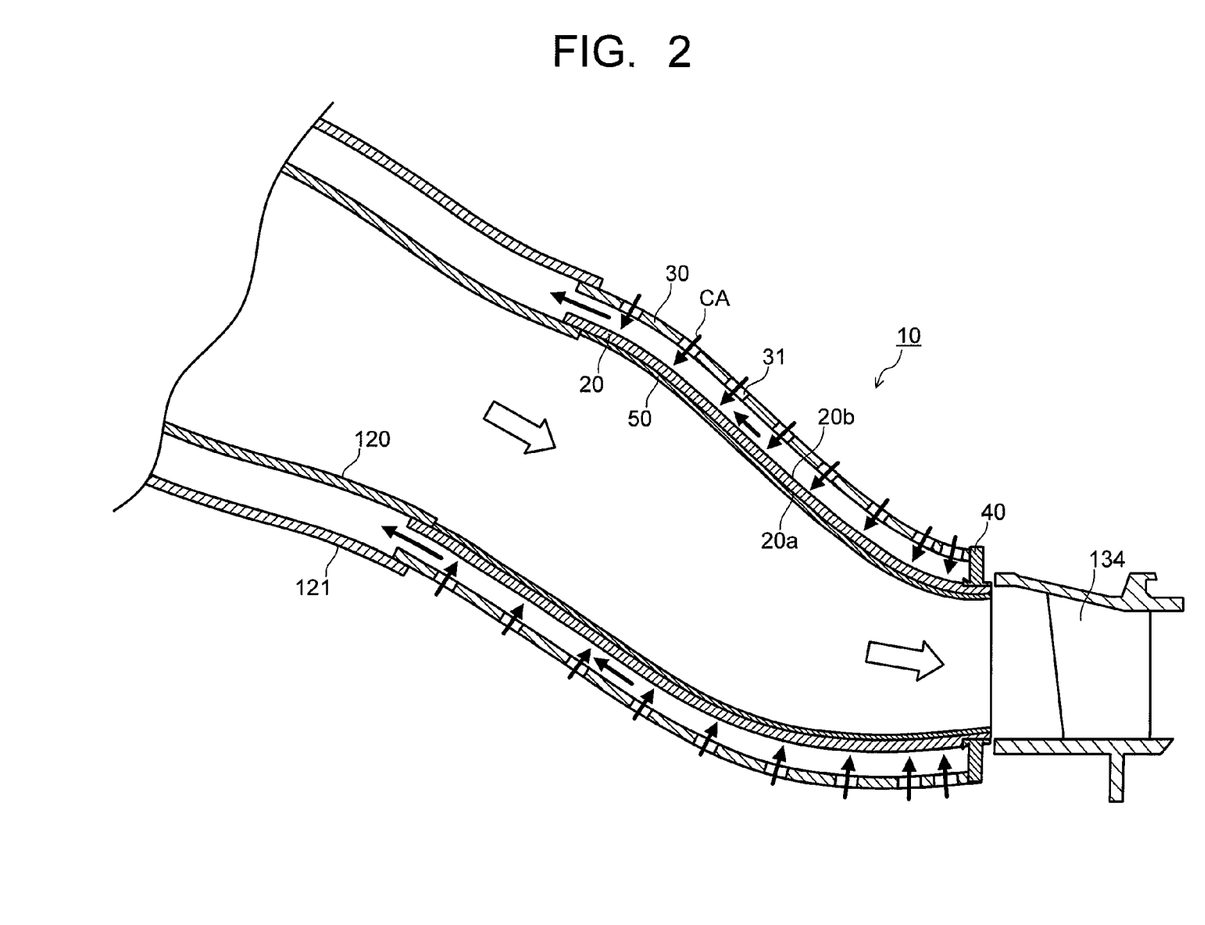
FIG. 2 is a view showing a cross section, of the transition piece having the damage-repairing method of the transition piece in the first embodiment according to the present invention applied thereto, along a flowing direction of a combustion gas.

FIG. 2 is a view showing a cross section, of the transition piece 10 having the damage-repairing method of the transition piece in the first embodiment according to the present invention applied thereto, along a flowing direction of the combustion gas.

As shown in FIG. 2, the transition piece 10 is formed into a double-shell structure provided with an inner duct 20 through which the combustion gas from the combustor liner 120 is supplied to be led to the turbine part 130 and an outer duct 30 provided so as to cover an outer periphery of the inner duct 20 with an interval space therebetween.

In the outer duct 30, a plurality of ejection holes 31 through which part of air from the compressor 110 is ejected onto an outer surface of the inner duct 20 are formed. Note that part of the air from the compressor 110, which is described above, functions as cooling air CA.

An upstream side end portion of the inner duct 20 (a left end portion of the inner duct 20 in FIG. 2) is opened into a circular shape. Into the opened end portion, an outlet side end portion of the cylindrical combustor liner 120 (a right end portion of the combustor liner 120 in FIG. 2) fits. On the other hand, a downstream side end portion of the inner duct 20 (a right end portion of the inner duct 20 in FIG. 2) is opened into a rectangular shape or a sector of annular shape. In this manner, the shape of a cross section, of the inner duct 20, perpendicular to the flowing direction of the combustion gas changes from a circular shape to a sector of annular shape. Further, a coating layer 50 is formed on an inner surface 20a, exposed to the combustion gas, of the inner duct 20.

The outer duct 30 has a shape corresponding to the shape of the inner duct 20, and an upstream side end portion of the outer duct 30 (a left end portion of the outer duct 30 in FIG. 2) is opened into a circular shape, and a downstream side end portion of the outer duct 30 (a right end portion of the outer duct 30 in FIG. 2) is opened into a rectangular shape or a sector of annular shape. Further, the upstream side end portion of the outer duct 30 (the left end portion of the outer duct 30 in FIG. 2) fits into an outlet side end portion of a cylindrical combustor outer cylinder 121 (a right end portion of the combustor outer cylinder 121 in FIG. 2) that is provided so as to cover an outer periphery of the combustor liner 120 with an interval space therebetween.

At a downstream side end portion between the inner duct 20 and the outer duct 30 of the transition piece 10 (a right end portion between the inner duct 20 and the outer duct 30 in FIG. 2), there is provided a flange-shaped picture frame 40 that seals one end between the inner duct 20 and the outer duct 30 to prevent outflow of the cooling air CA to a turbine part 130 side.

Figure 3:
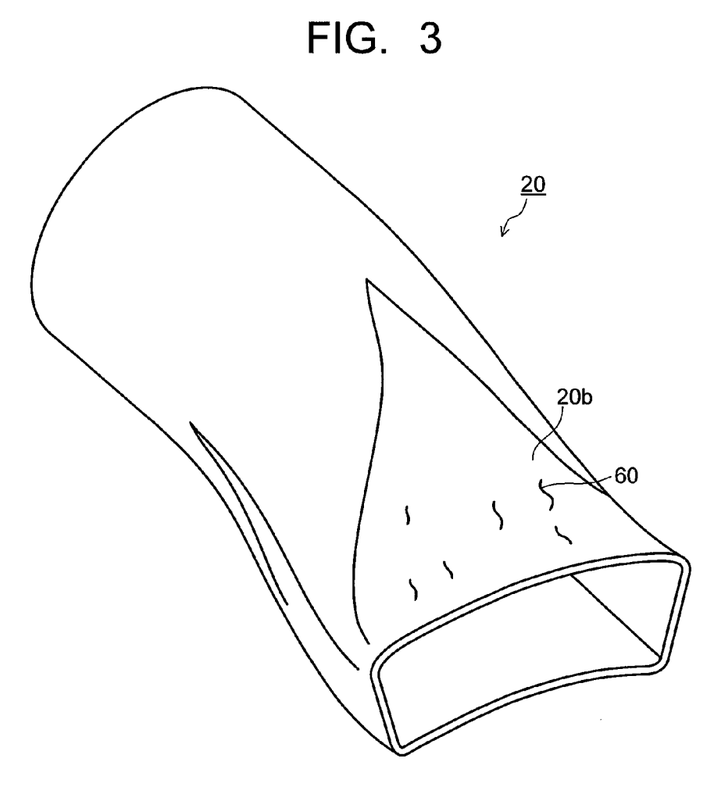
FIG. 3 is a perspective view of an inner duct of the transition piece having the damage-repairing method of the transition piece in the first embodiment according to the present invention applied thereto.
Figure 4:
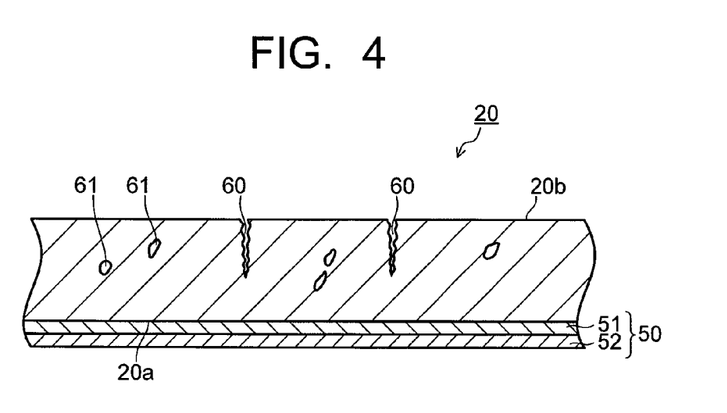
FIG. 4 is a view showing part of a cross section of the inner duct of the transition piece having the damage-repairing method of the transition piece in the first embodiment according to the present invention applied thereto.

FIG. 3 is a perspective view of the inner duct 20 of the transition piece 10 having the damage-repairing method of the transition piece in the first embodiment according to the present invention applied thereto. FIG. 4 is a view showing part of the cross section of the inner duct 20 of the transition piece 10 having the damage-repairing method of the transition piece in the first embodiment according to the present invention applied thereto.

The inner duct 20 of the transition piece 10 shown in FIG. 3 and FIG. 4 has been used for a gas turbine in a power generating plant for a long period of time. In an outer surface 20b of the inner duct 20, cracks 60 being damage occur. Further, in the inner duct 20, as shown in FIG. 4, creep voids 61 occur due to creep damage. The above creep void 61 occurs in crystal grain boundaries of a base material forming the inner duct 20. Further, the above creep voids 61 are coupled to grow to the crack 60. Note that as the damage, for example, reduction in thickness due to oxidation or erosion, and so on are included, besides the above-described cracks 60 and creep voids 61.

As described above, the coating layer 50 is formed on the inner surface 20a of the inner duct 20. The coating layer 50, as shown in FIG. 4, is provided with a metal layer 51 that is formed on the inner surface 20a of the inner duct 20 and formed of metallic materials, and a ceramic layer 52 that is formed to be layered on a surface of the above metal layer 51 and formed of ceramic materials.

The inner duct 20 of the transition piece 10 is formed of a Ni-base superalloy such as, for example, Nimonic263 or Hastelloy X. The metal layer 51 of the coating layer 50 is formed of a metal such as NiCoCrAlY, for example. The ceramic layer 52 of the coating layer 50 is formed of ceramic such as $ZrO_2$ that contains 8% of $Y_2O_3$ to be stabilized, for example. Further, the metal layer 51 is formed by, for example, high velocity oxygen fuel (HVOF) spraying, vacuum plasma spraying (VPS), or the like, and the ceramic layer 52 is formed by, for example, atmospheric plasma spraying (APS), or the like.

Here, a damage-repairing method in the inner duct 20, having the cracks 60 in its outer surface 20b and having the creep voids 61 inside its thickness, of the transition piece 10, which is shown in FIG. 4, is taken as an example to be explained.

Figure 5:
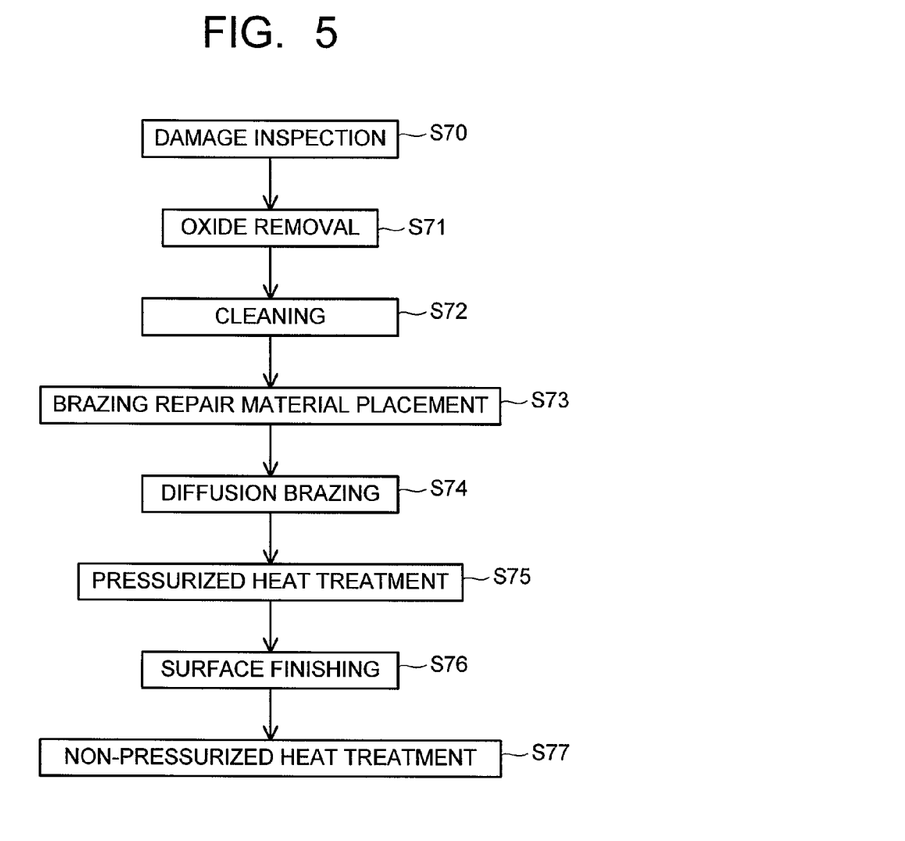
FIG. 5 is a flowchart for explaining steps of the damage-repairing method of the transition piece in the first embodiment according to the present invention.

FIG. 5 is a flowchart for explaining steps of the damage-repairing method of the transition piece in the first embodiment according to the present invention. FIG. 6 to FIG. 9 are views for explaining the steps of the damage-repairing method of the transition piece in the first embodiment according to the present invention, and each show part of the cross section of the inner duct 20 of the transition piece 10 in each of the steps.

First, the inner duct 20 of the transition piece 10, which is to be repaired, is observed visually, and whether or not the crack 60 exists, a place where the crack 60 occurs, and the like are confirmed. Further, by penetrant inspection, whether or not the crack 60 and the creep void 61 exist, places where the crack 60 and the creep void 61 occur, and the like are inspected (step S70). Incidentally, before confirming and inspecting the damage, processing similar to later-described cleaning processing (step S72) may also be performed.

Subsequently, an oxide formed on the outer surface 20b of the inner duct 20 is removed (an oxide removing step (step S71)). The oxide is removed by, for example, blast processing in which abrasive particles made of alumina and so on are sprayed at high speed, or the like. Further, the oxide inside the cracks 60 is heat treated in, for example, a hydrogen fluoride atmosphere (at a temperature of 1000° C. or lower, for example) and is deoxidized to thereby be removed.

Subsequently, the outer surface 20b (including the cracks 60), from which the oxide has been removed, of the inner duct 20 is cleaned (step S72). In a cleaning step, dirt, oil, and the like on the outer surface 20b of the inner duct 20 are wiped out with, for example, a waste cloth into which an organic solvent of hydrocarbon or the like permeates, or the like.

Figure 6:
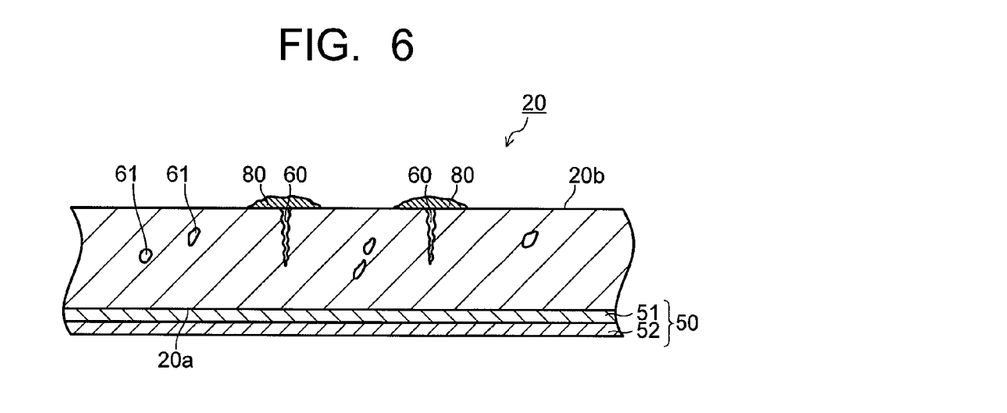
FIG. 6 is a view for explaining the step of the damage-repairing method of the transition piece in the first embodiment according to the present invention, and shows part of the cross section of the inner duct of the transition piece in each of the steps.

Subsequently, as shown in FIG. 6, a brazing repair material 80 is placed so as to cover the entire crack 60 in the outer surface 20b of the inner duct 20 (a repair material placing step (step S73)).

The brazing repair material 80 is provided with a mixed powder made by mixing a Ni-base molten alloy powder that is melted by a later-described diffusion heat treatment and a Ni-base non-molten alloy powder that has a melting point higher than that of the above Ni-base molten alloy powder and is not melted by the diffusion heat treatment. The Ni-base molten alloy powder is formed of Ni-base alloys such as BNi-1, BNi-1A, BNi-2, BNi-3, BNi-4, BNi-5, BNi-6, and BNi-7, which are specified in JIS Z3265, Ni-base alloys such as Ni—Cr—W—Fe—Si—B based alloy, Ni—Si—B based alloy, Ni—Co—Cr—Mo—Fe—B based alloy, Ni—Cr—B based alloy, and Ni—Co—Si—B based alloy, and so on. The Ni-base non-molten alloy powder is formed of not only a Ni-base superalloy such as Nimonic263 (brand name) or Hastelloy X (brand name), which is the same as the material forming the inner duct 20, but also MarM247 (brand name), GTD111 (brand name), IN738LC (brand name), or the like.

A content ratio of the Ni-base molten alloy powder in the brazing repair material 80 is preferably set to 30 to 90 mass %. The reason why the above range is preferable is that if the content ratio of the Ni-base molten alloy powder is less than 30 mass %, wettability of the brazing repair material 80 decreases, and if the content ratio of the Ni-base molten alloy powder exceeds 90 mass %, strength of a portion to be repaired decreases.

As the brazing repair material 80, the mixed powder made by mixing the Ni-base molten alloy powder and the Ni-base non-molten alloy powder that are formed of the above-described Ni-base alloys itself may also be used. Further, the brazing repair material 80 may also be made in paste form by adding a binder material for brazing to the above mixed powder. The brazing repair material 80 is placed so as to cover the entire crack 60 in the outer surface 20b of the inner duct 20 by, for example, brush coating, spraying by spray injection, or the like. Incidentally, as for the crack 60 with a large width, the brazing repair material 80 is sometimes placed also into the inside of the crack 60 at this placement stage.

In order to prevent the brazing repair material 80 from running down, the brazing repair material 80 may also be covered with a fixing material made of, for example, zirconia and silica after the brazing repair material 80 being placed. The above fixing material can be peeled off by hand or removed by slightly applying vibration thereto by a hammer or the like after a later-described diffusion brazing step (step S74).

Figure 7:
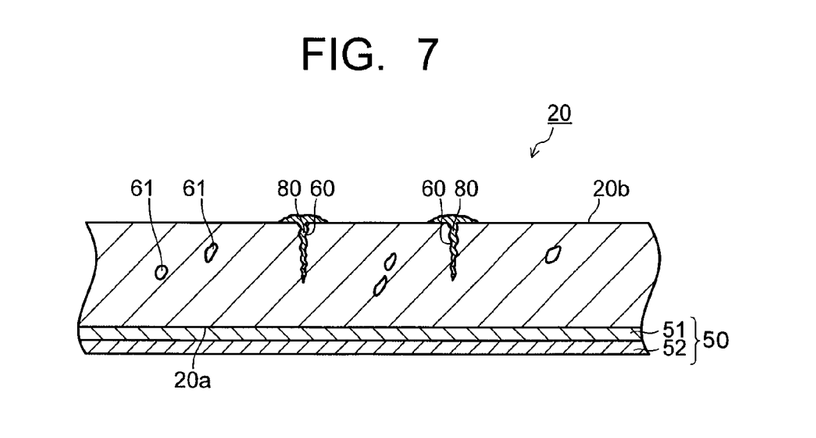
FIG. 7 is a view for explaining the step of the damage-repairing method of the transition piece in the first embodiment according to the present invention, and shows part of the cross section of the inner duct of the transition piece in each of the steps.

Subsequently, the inner duct 20 with the brazing repair materials 80 placed thereon is placed in a vacuum heat treatment furnace, and has the diffusion heat treatment performed therefor (the diffusion brazing step (step S74)). In the above diffusion heat treatment, the inner duct 20 is maintained at a temperature of 1000 to 1200° C. for 10 minutes to 2 hours. By the above diffusion heat treatment, the Ni-base molten alloy powder of the brazing repair material 80 is melted, and as shown in FIG. 7, the Ni-base non-molten alloy powder, together with the melted Ni-base molten alloy powder, is introduced into the inside of each of the cracks 60.

When the diffusion heat treatment is performed in a vacuum atmosphere, oxidation of the brazing repair materials 80 at the time of heat treatment can be prevented thereby. Further, the temperature of the diffusion heat treatment is set to 1000 to 1200° C., and thereby the Ni-base molten alloy powder can be melted sufficiently, resulting in that diffusion of the brazing repair materials 80 into the base material forming the inner duct 20 is obtained.

Subsequently, a pressurized heat treatment is performed for the inner duct 20 of which the cracks 60 in the outer surface 20b have been repaired (a pressurized heat treating step (step S75). In the pressurized heat treatment, the inner duct 20 disposed in a predetermined vessel is heated and pressurized under conditions of temperature of 1000 to 1200° C. and pressure of 100 to 200 MPa. Further, in order to prevent oxidation of the inner duct 20, an argon gas and so on are used to form a pressurized atmosphere.

Figure 8:
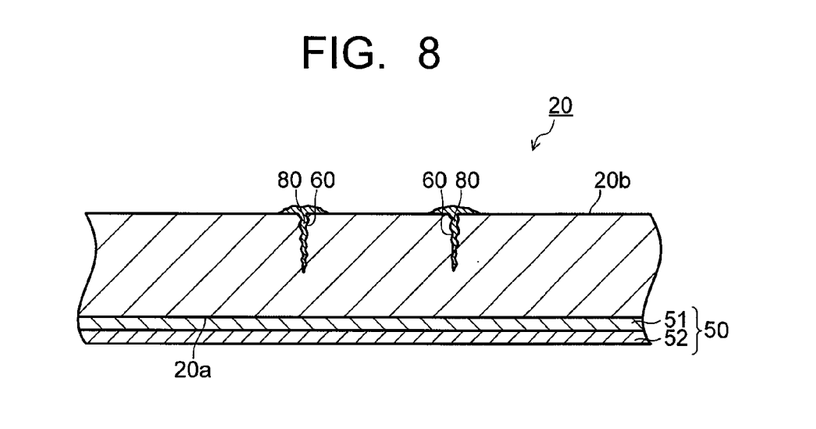
FIG. 8 is a view for explaining the step of the damage-repairing method of the transition piece in the first embodiment according to the present invention, and shows part of the cross section of the inner duct of the transition piece in each of the steps.

The temperature is set to fall within the above range, and thereby deterioration of the base material forming the inner duct 20 is recovered. Further, the pressure is set to fall within the above range, and thereby, as shown in FIG. 8, it becomes possible to let the creep voids 61 formed in the thickness of the inner duct 20 disappear. Further, even in the case when the brazing repair material 80 does not reach the tip of the crack 60 to thereby leave a void at the tip in the diffusion brazing step (step S74), for example, by performing the pressurized heat treatment, the brazing repair material 80 is led to the tip of the crack 60, resulting in that it becomes possible to let the void disappear.

Incidentally, it is possible that the diffusion heat treated inner duct 20 is cooled down to the normal temperature once, and then is subjected to the pressurized heat treatment, or it is also possible that the diffusion heat treated inner duct 20 is not cooled but is subjected to the pressurized heat treatment subsequently to the diffusion heat treatment. Further, the diffusion heat treatment is performed in a vacuum atmosphere and the pressurized heat treatment is performed in a high-pressure atmosphere, but by using a heat treatment apparatus capable of controlling a pressure field to be in a range from vacuum to high pressure, the diffusion heat treatment and the pressurized heat treatment can be performed continuously.

Figure 9:
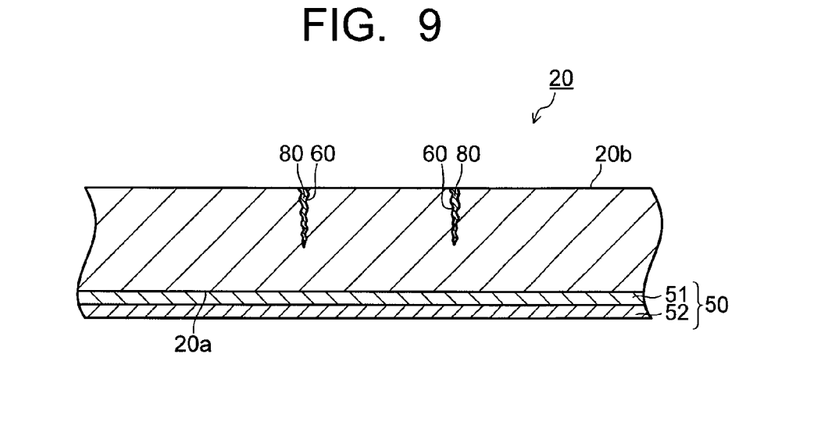
FIG. 9 is a view for explaining the step of the damage-repairing method of the transition piece in the first embodiment according to the present invention, and shows part of the cross section of the inner duct of the transition piece in each of the steps.

Subsequently, on the outer surface 20b of the pressurized heat treated inner duct 20, surface finishing, in which a portion of the brazing repair material 80 projecting is scraped off to turn the outer surface 20b to the original surface shape as shown in FIG. 9, is performed (a surface finishing step (step S76)). The surface finishing is performed by using, for example, a grinder or the like.

Subsequently, the surface finished inner duct 20 is subjected to a solution heat treatment and an aging heat treatment under non-pressure (a non-pressurized heat treating step (step S77)). The solution heat treatment and the aging heat treatment are performed under standard conditions (of temperature, time, and soon) according to the materials forming the inner duct 20, the shape of the inner duct 20, and so on.

Note that the non-pressurized heat treating step may also be performed before the surface finishing step. That is, the surface finishing step may also be performed at the end.

Through the above steps, the damage repairing is completed.

In the above-described damage-repairing method of the transition piece in the first embodiment, as shown in FIG. 4, the case where the cracks 60 formed in the outer surface 20b of the inner duct 20 of the transition piece 10 do not get into the coating layer 50 formed on the inner surface 20a of the inner duct 20 has been taken as an example to be explained.

Next, the case where the crack 60 formed in the outer surface 20b of the inner duct 20 of the transition piece 10 gets into the coating layer 50 formed on the inner surface 20a of the inner duct 20 will be explained. Here, steps different from the above-described repairing steps will be mainly explained.

Figure 10:
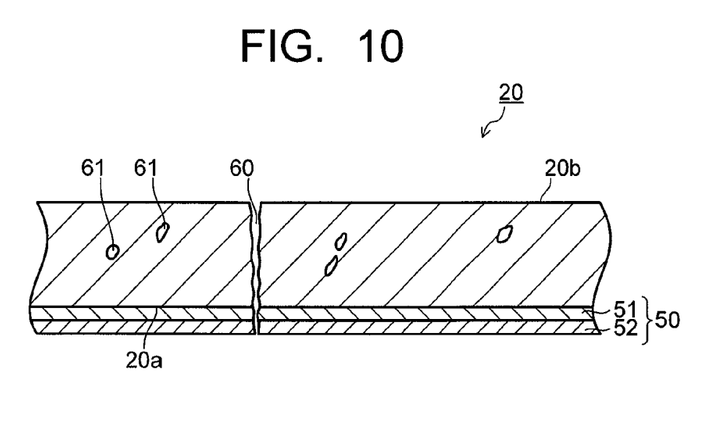
FIG. 10 is a view for explaining a step of the damage-repairing method of the transition piece with different damage formation in the first embodiment according to the present invention, and shows part of the cross section of the inner duct of the transition piece in each step.
Figure 11:
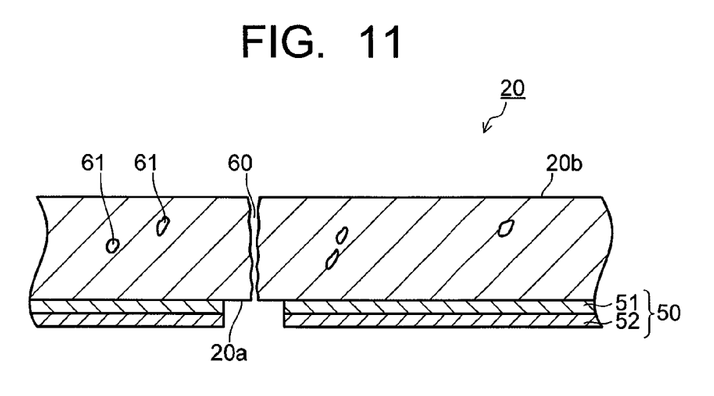
FIG. 11 is a view for explaining a step of the damage-repairing method of the transition piece with the different damage formation in the first embodiment according to the present invention, and shows part of the cross section of the inner duct of the transition piece in each step.
Figure 12:
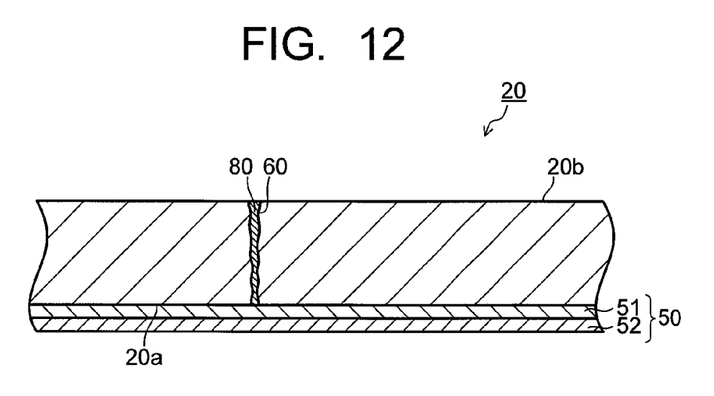
FIG. 12 is a view for explaining a step of the damage-repairing method of the transition piece with the different damage formation in the first embodiment according to the present invention, and shows part of the cross section of the inner duct of the transition piece in each step.

FIG. 10 to FIG. 12 are views for explaining steps of the damage-repairing method of the transition piece with different damage formation in the first embodiment according to the present invention, and each show part of the cross section of the inner duct 20 of the transition piece 10 in each of the steps.

As shown in FIG. 10, in the case when the crack 60 formed in the outer surface 20b of the inner duct 20 of the transition piece 10 gets into the coating layer 50 formed on the inner surface 20a of the inner duct 20, a step of repairing an inner surface 20a side of the inner duct 20 is added.

First, after confirming and inspecting the damage (step S70) and before the oxide removing step (step S71), as shown in FIG. 11, the coating layer 50 corresponding to a portion into which the crack 60 gets is removed (a coating layer removing step). Here, at least the coating layer 50 corresponding to the portion into which the crack 60 gets is only necessary to be removed, but the coating layer 50 corresponding not only to the portion into which the crack 60 gets but also to the periphery of the portion into which the crack 60 gets is preferably removed.

Note that the coating layer removing step may also be performed after the oxide removing step (step S71) and before the cleaning step (step S72).

In the step of removing the coating layer 50, the ceramic layer 52 formed on an outermost side of the inner surface 20a of the inner duct 20 is first removed. The ceramic layer 52 is removed by, for example, blast processing in which particles made of alumina and so on are sprayed at high speed, or the like. Then, after the ceramic layer 52 being removed, the metal layer 51 is removed. The metal layer 51, similarly to the ceramic layer 52, is removed by blast processing in which abrasive particles made of alumina and so on are sprayed at high speed, or the like. Note that the metal layer 51 may also be removed by, for example, a chemical treatment using chemicals such as hydrochloric acid and phosphoric acid that are able to remove the metal layer 51, or the like.

Subsequently, in the above-described cleaning step (step S72), the inner surface 20a, from which the coating layer 50 has been removed, of the inner duct 20 is cleaned similarly to the outer surface 20b, from which the oxide has been removed, of the inner duct 20.

Then, the above-described processing and treatments in the steps of step S73 to step S76 that are shown in FIG. 5 are performed.

Subsequently, after the surface finishing step (step S76) and before the non-pressurized heat treating step (step S77), the coating layer 50 is formed on the portion from which the coating layer 50 has been removed in the coating layer removing step as shown in FIG. 12 (a coating layer forming step).

In the step of forming the coating layer 50, first, the metal layer 51 is formed in a manner that a metal powder is sprayed onto the inner surface 20a, from which the coating layer 50 has been removed in the coating layer removing step, of the inner duct 20 by high velocity oxygen fuel (HVOF) spraying, vacuum plasma spraying (VPS), or the like. Subsequently, on a surface of the metal layer 51, the ceramic layer 52 is formed by, for example, atmospheric plasma spraying (APS) or the like.

Then, the above-described treatment in the step of step S77 that is shown in FIG. 5 is performed.

Incidentally, in the diffusion brazing step (step S74), in order to prevent the brazing repair material 80 from running down from the tip of the crack 60, the above-described fixing material may also be provided on a tip portion of the crack 60 from which the coating layer 50 has been removed.

Through the above steps, the damage repairing is completed.

As described above, according to the damage-repairing method of the transition piece in the first embodiment, the cracks 60 being the damage can be repaired by the diffusion brazing without the inner duct 20 of the transition piece 10 being deformed. Further, the brazing repair material 80 contains the materials forming the inner duct 20 or the Ni-base non-molten alloy powder having chemical composition similar to that of the materials of the inner duct 20, and thereby after the diffusion heat treatment, the repaired portion can obtain mechanical strength at a level equal to that of the base material forming the inner duct 20.

Further, when the pressurized heat treatment is performed for the inner duct 20 of which the cracks 60 in the outer surface 20b have been repaired, it is possible to thereby let the creep voids 61 formed in the thickness of the inner duct 20 and being the damage disappear. Thereby, the deterioration of the base material forming the inner duct 20 is recovered, so that the mechanical strength of the inner duct 20 after being repaired becomes equal to that of the new inner duct 20 before being used.

Incidentally, in the damage-repairing method of the transition piece in the first embodiment, the case where the inner duct 20 has the cracks 60 and the creep voids 61 as the damage has been explained, but the above-described damage-repairing method is applicable also to a portion in which reduction in thickness is caused due to oxidation or erosion as the damage. In the above case as well, operations and effects similar to those in the above-described damage-repairing method can be obtained.

Second Embodiment

A damage-repairing method of a transition piece in a second embodiment is one in which a step of removing damage is added to the damage-repairing method of the transition piece in the first embodiment. Incidentally, when removing damage, an oxide also removed, so that the oxide removing step in the damage-repairing method of the transition piece in the first embodiment is not included. Here, steps different from those in the damage-repairing method of the transition piece in the first embodiment will be mainly explained.

Figure 13:
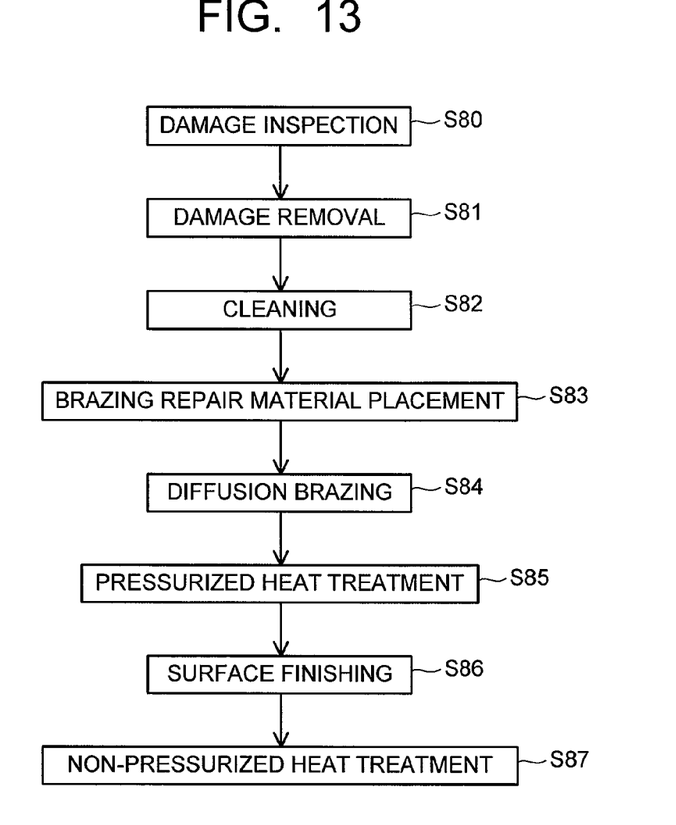
FIG. 13 is a flowchart for explaining steps of a damage-repairing method of a transition piece in a second embodiment according to the present invention.

FIG. 13 is a flowchart for explaining steps of the damage-repairing method of the transition piece in the second embodiment according to the present invention. FIG. 14 to FIG. 17 are views for explaining the steps of the damage-repairing method of the transition piece in the second embodiment according to the present invention, and each show part of the cross section of the inner duct 20 of the transition piece 10 in each of the steps. Incidentally, component parts that are the same as those explained in the damage-repairing method of the transition piece in the first embodiment are denoted by the same reference numerals, and overlapped explanation thereof is omitted or simplified.

Here, similarly to the above-described first embodiment, a damage-repairing method in the inner duct 20, having the cracks 60 in its outer surface 20b and having the creep voids 61 in its thickness, of the transition piece 10 is taken as an example to be explained.

First, the inner duct 20 of the transition piece 10, which is to be repaired, is observed visually, and whether or not the crack 60 exists, a place where the crack 60 occurs, and the like are confirmed. Further, by penetrant inspection, whether or not the crack 60 and the creep void 61 exist, places where the crack 60 and the creep void 61 occur, and the like are inspected (step S80). Incidentally, before confirming and inspecting the damage, processing similar to later-described cleaning processing (step S82) may also be performed.

Figure 14:
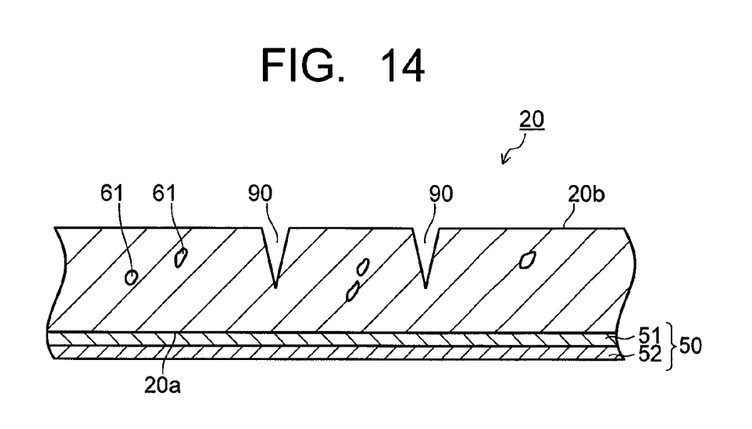
FIG. 14 is a view for explaining the step of the damage-repairing method of the transition piece in the second embodiment according to the present invention, and shows part of the cross section of the inner duct of the transition piece in each of the steps.

Subsequently, the cracks 60 in the outer surface 20b of the inner duct 20 as shown in FIG. 4 are removed by grinding with a grind stone or the like, or by chipping (a damage removing step (step S81)). The portion from which the crack 60 has been removed, as shown in FIG. 14, turns into a taper-shaped beveled groove 90 whose groove cross-sectional area increases toward an outer surface 20b side of the inner duct 20, for example.

Subsequently, similarly to the first embodiment, the outer surface 20b (including the beveled grooves 90) of the inner duct 20 is cleaned (step S82).

Figure 15:
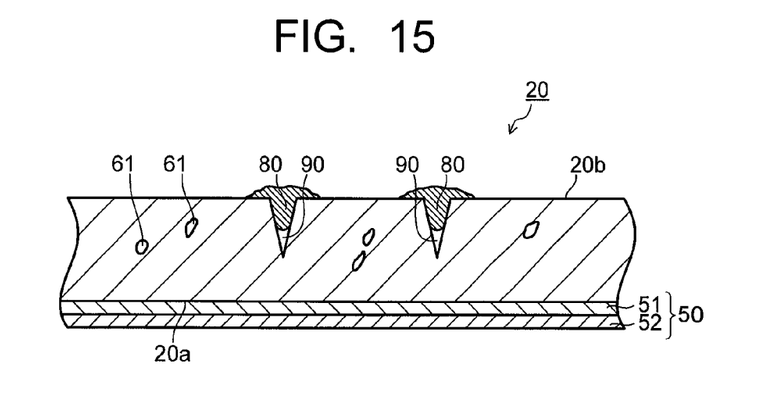
FIG. 15 is a view for explaining the step of the damage-repairing method of the transition piece in the second embodiment according to the present invention, and shows part of the cross section of the inner duct of the transition piece in each of the steps.

Subsequently, as shown in FIG. 15, the brazing repair material 80 is placed so as to cover the entire beveled groove 90 (a repair material placing step (step S83)). On this occasion, the brazing repair material 80 is placed also into the inside of the beveled groove 90. Note that the brazing repair material 80 is formed of materials similar to those in the first embodiment.

Subsequently, the inner duct 20 with the brazing repair materials 80 placed thereon is placed in a vacuum heat treatment furnace, and has diffusion heat treatment performed therefor (a diffusion brazing step (step S84)). In the above diffusion heat treatment, the inner duct 20 is maintained at a temperature of 1000 to 1200° C. for 10 minutes to 2 hours.

Figure 16:
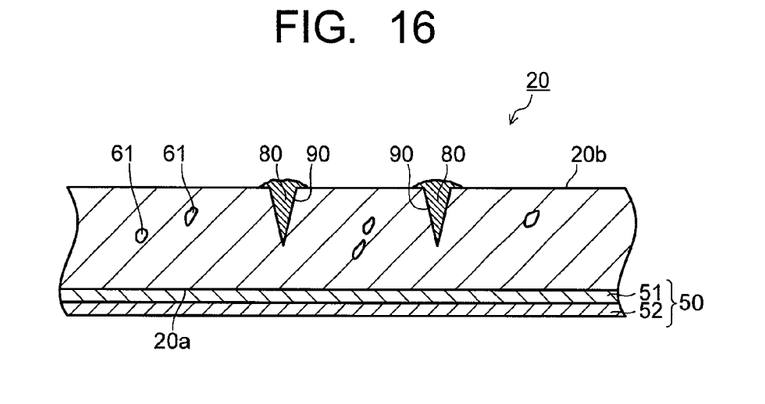
FIG. 16 is a view for explaining the step of the damage-repairing method of the transition piece in the second embodiment according to the present invention, and shows part of the cross section of the inner duct of the transition piece in each of the steps.

By the above diffusion heat treatment, the Ni-base molten alloy powder of the brazing repair material 80 is melted, and as shown in FIG. 16, the Ni-base non-molten alloy powder, together with the melted Ni-base molten alloy powder, spreads out inside each of the beveled grooves 90.

Subsequently, similarly to the first embodiment, a pressurized heat treatment is performed (a pressurized heat treating step (step S85)).

Figure 17:
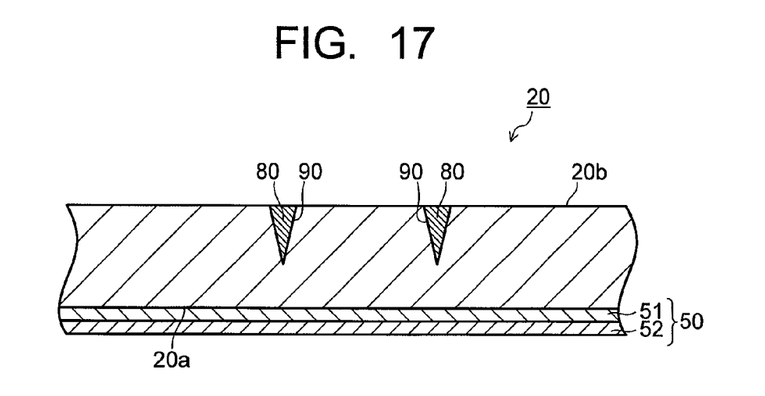
FIG. 17 is a view for explaining the step of the damage-repairing method of the transition piece in the second embodiment according to the present invention, and shows part of the cross section of the inner duct of the transition piece in each of the steps.

Subsequently, similarly to the first embodiment, as shown in FIG. 17, surface finishing that turns the outer surface 20*b* to the original surface shape is performed (a surface finishing step (step S86)).

Subsequently, similarly to the first embodiment, the surface finished inner duct 20 is subjected to a solution heat treatment and an aging heat treatment under non-pressure (a non-pressurized heat treating step (step S87)).

Note that the non-pressurized heat treating step may also be performed before the surface finishing step. That is, the surface finishing step may also be performed at the end.

Through the above steps, the damage repairing is completed.

In the above-described damage-repairing method of the transition piece in the second embodiment, as shown in FIG. 4, the case where the cracks 60 formed in the outer surface 20*b* of the inner duct 20 of the transition piece 10 do not get into the coating layer 50 formed on the inner surface 20*a* of the inner duct 20 has been taken as an example to be explained.

Next, the case where the crack 60 formed in the outer surface 20*b* of the inner duct 20 of the transition piece 10 gets into the coating layer 50 formed on the inner surface 20*a* of the inner duct 20 will be explained. Here, steps different from the above-described repairing steps will be mainly explained.

Figure 18:
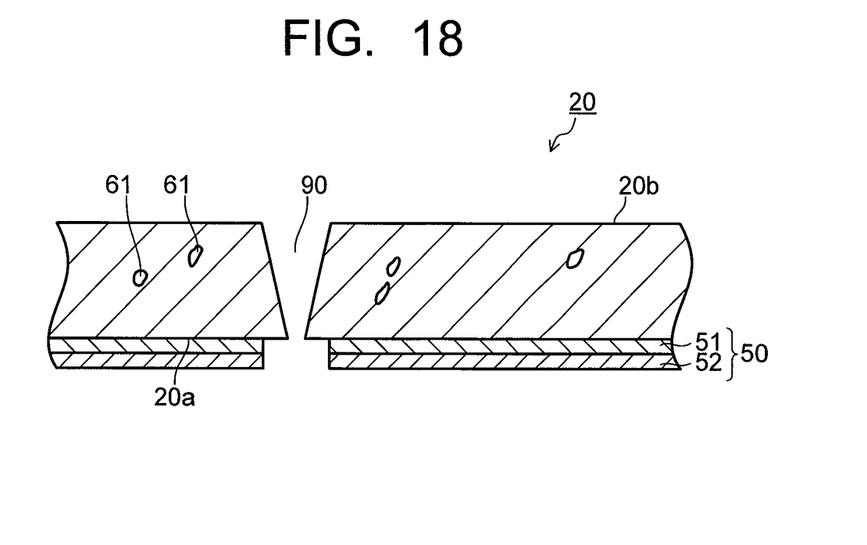
FIG. 18 is a view for explaining a step of the damage-repairing method of the transition piece with different damage formation in the second embodiment according to the present invention, and shows part of the cross section of the inner duct of the transition piece in each step.
Figure 19:
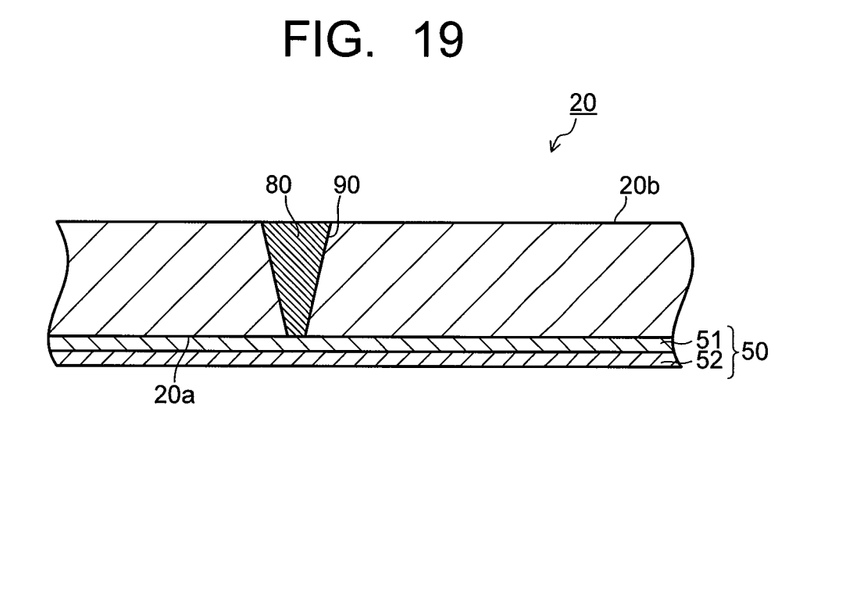
FIG. 19 is a view for explaining a step of the damage-repairing method of the transition piece with the different damage formation in the second embodiment according to the present invention, and shows part of the cross section of the inner duct of the transition piece in each step.

FIG. 18 and FIG. 19 are views for explaining steps of the damage-repairing method of the transition piece with different damage formation in the second embodiment according to the present invention, and each show part of the cross section of the inner duct 20 of the transition piece 10 in each of the steps.

As shown in FIG. 10, in the case when the crack 60 formed in the outer surface 20*b* of the inner duct 20 of the transition piece 10 gets into the coating layer 50 formed on the inner surface 20*a* of the inner duct 20, a step of repairing the inner surface 20*a* side of the inner duct 20 is added.

First, after confirming and inspecting the damage (step S80) and before the damage removing step (step S81), as shown in FIG. 11, the coating layer 50 corresponding to a portion into which the crack 60 gets is removed (a coating layer removing step). Here, at least the coating layer 50 corresponding to the portion into which the crack 60 gets is only necessary to be removed, but, the coating layer 50 corresponding not only to the portion into which the crack 60 gets but also to the periphery of the portion into which the crack 60 gets is preferably removed.

Note that the coating layer removing step may also be performed after the damage removing step (step S81) and before the cleaning step (step S82).

Subsequently, the crack 60 extending from the outer surface 20*b* to the inner surface 20*a* of the inner duct 20 is removed by grinding with a grind stone or the like, or by chipping (the damage removing step (step S81)). The portion from which the crack 60 has been removed, as shown in FIG. 18, turns into the taper-shaped beveled groove 90 whose groove cross-sectional area increases toward the outer surface 20*b* side of the inner duct 20, for example.

Subsequently, in the above-described cleaning step (step S82), the inner surface 20*a*, from which the coating layer 50 has been removed, of the inner duct 20 is cleaned similarly to the outer surface 20*b* (including the beveled groove 90) of the inner duct 20.

Then, the above-described processing and treatments in the steps of step S83 to step S86 that are shown in FIG. 13 are performed.

Subsequently, after the surface finishing step (step S86) and before the non-pressurized heat treating step (step S87), as shown in FIG. 19, the coating layer 50 is formed on the portion from which the coating layer 50 has been removed in the coating layer removing step (a coating layer forming step).

Then, the above-described treatment in the step of step S87 that is shown in FIG. 13 is performed.

Incidentally, in the diffusion brazing step (step S84), in order to prevent the brazing repair material 80 from running down from the tip (a lower open portion) of the beveled groove 90, the above-described fixing material may also be provided on the tip of the beveled groove 90 from which the coating layer 50 has been removed.

Through the above steps, the damage repairing is completed.

As described above, according to the damage-repairing method of the transition piece in the second embodiment, the cracks 60 being the damage can be repaired by the diffusion brazing without the inner duct 20 of the transition piece 10 being deformed. Further, the brazing repair material 80 contains the materials forming the inner duct 20 or the Ni-base non-molten alloy powder having chemical composition similar to that of the materials of the inner duct 20, and thereby after the diffusion heat treatment, the repaired portion can obtain mechanical strength at a level equal to that of the base material forming the inner duct 20.

Further, when the pressurized heat treatment is performed for the inner duct 20 of which the cracks 60 in the outer surface 20*b* have been repaired, it is possible to thereby let the creep voids 61 formed in the thickness of the inner duct 20 and being the damage disappear. Thereby, the deterioration of the base material forming the inner duct 20 is recovered, so that the mechanical strength of the inner duct 20 after being repaired becomes equal to that of the new inner duct 20 before being used.

Incidentally, in the damage-repairing method of the transition piece in the second embodiment, the case where the inner duct 20 has the cracks 60 and the creep voids 61 as the damage has been explained, but the above-described damage-repairing method is applicable also to a portion in which reduction in thickness is caused due to oxidation or erosion as the damage. In the above case as well, operations and effects similar to those in the above-described damage-repairing method can be obtained.

According to the above-explained embodiments, even when damage occurs over an extended range, it becomes possible to easily repair the damage without a component member of the transition piece being deformed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A damage-repairing method of a transition piece, the method repairing a crack in the transition piece, the method comprising:
   an oxide removing step of removing an oxide on an outer surface of the transition piece having the crack so as not to remove the crack;
   a repair material placing step of placing a brazing repair material on the outer surface, from which the oxide has been removed, of the transition piece so as to cover the crack;
   a fixing material placing step of covering the brazing repair material with a fixing material made of zirconia or silica, the brazing repair material being placed so as to cover the crack;
   a diffusion brazing step of diffusion heat treating the transition piece with the brazing repair material placed thereon and melting the brazing repair material to repair the crack formed in the outer surface;
   a pressurized heat treating step of, under high pressure, heat treating the transition piece of which the crack formed in the outer surface has been repaired;
   a surface finishing step of scraping off the brazing repair material projecting from the outer surface of the pressurized heat treated transition piece; and
   a non-pressurized heat treating step of, under non-pressure, solution heat treating and aging heat treating the surface finished transition piece.

2. A damage-repairing method of a transition piece, the method repairing a crack in the transition piece, the method comprising:
   an oxide removing step of removing an oxide on an outer surface of the transition piece having the crack so as not to remove the crack;
   a repair material placing step of placing a brazing repair material on the outer surface, from which the oxide has been removed, of the transition piece so as to cover the crack;
   a diffusion brazing step of diffusion heat treating the transition piece with the brazing repair material placed thereon and melting the brazing repair material to repair the crack formed in the outer surface;
   a pressurized heat treating step of, under high pressure, heat treating the transition piece of which the crack formed in the outer surface has been repaired;
   a surface finishing step of scraping off the brazing repair material projecting from the outer surface of the pressurized heat treated transition piece;
   a non-pressurized heat treating step of, under non-pressure, solution heat treating and aging heat treating the surface finished transition piece, wherein the crack gets into a first coating layer formed on an inner surface of the transition piece;
   a coating layer removing step of removing the first coating layer corresponding to at least a portion into which the crack gets before or immediately after the oxide removing step; and
   a coating layer forming step of forming a second coating layer on the portion from which the first coating layer has been removed in the coating layer removing step between the surface finishing step and the non-pressurized heat treating step,
   wherein a fixing material made of zirconia or silica is provided on a tip portion of the crack from which the coating layer has been removed, in the diffusion brazing step.

3. A damage-repairing method of a transition piece, the method repairing a crack in the transition piece, the method comprising:
   a damage removing step of removing the whole crack formed in an outer surface of the transition piece;
   a repair material placing step of placing a brazing repair material so as to cover the portion from which the crack has been removed;
   a diffusion brazing step of diffusion heat treating the transition piece with the brazing repair material placed thereon and melting the brazing repair material to repair the portion from which the crack in the outer surface has been removed;
   a pressurized heat treating step of, under high pressure, heat treating the transition piece of which the crack formed in the outer surface has been repaired;
   a surface finishing step of scraping off the brazing repair material projecting from the outer surface of the pressurized heat treated transition piece;
   a non-pressurized heat treating step of, under non-pressure, solution heat treating and aging heat treating the surface finished transition piece, wherein the crack gets into a first coating layer formed on an inner surface of the transition piece;
   a coating layer removing step of removing the first coating layer corresponding to at least a portion into which the crack gets before or immediately after the damage removing step; and
   a coating layer forming step of forming a second coating layer on the portion from which the first coating layer has been removed in the coating layer removing step between the surface finishing step and the non-pressurized heat treating step,
   wherein a fixing material made of zirconia or silica is provided on a tip portion of the crack from which the coating layer has been removed, in the diffusion brazing step.

4. The damage-repairing method of the transition piece according to claim 1,
   wherein the crack gets into a first coating layer formed on an inner surface of the transition piece, the method further comprising:
   a coating layer removing step of removing the first coating layer corresponding to at least a portion into which the crack gets before or immediately after the oxide removing step; and
   a coating layer forming step of forming a second coating layer on the portion from which the first coating layer has been removed in the coating layer removing step between the surface finishing step and the non-pressurized heat treating step.

5. The damage-repairing method of the transition piece according to claim 1,
   wherein the brazing repair material contains a mixed powder made by mixing a Ni-base molten alloy powder that is melted by a diffusion heat treatment and a Ni-base non-molten alloy powder that has a melting point higher than that of the Ni-base molten alloy powder and is not melted by the diffusion heat treatment.

6. The damage-repairing method of the transition piece according to claim 2,
wherein the brazing repair material contains a mixed powder made by mixing a Ni-base molten alloy powder that is melted by a diffusion heat treatment and a Ni-base non-molten alloy powder that has a melting point higher than that of the Ni-base molten alloy powder and is not melted by the diffusion heat treatment.

7. The damage-repairing method of the transition piece according to claim 3,
wherein the brazing repair material contains a mixed powder made by mixing a Ni-base molten alloy powder that is melted by a diffusion heat treatment and a Ni-base non-molten alloy powder that has a melting point higher than that of the Ni-base molten alloy powder and is not melted by the diffusion heat treatment.

8. The damage-repairing method of the transition piece according to claim 1,
wherein, in the brazing repair material, a content ratio of the Ni-base molten alloy powder is 30 to 90 mass %.

9. The damage-repairing method of the transition piece according to claim 2,
wherein, in the brazing repair material, a content ratio of the Ni-base molten alloy powder is 30 to 90 mass %.

10. The damage-repairing method of the transition piece according to claim 3,
wherein, in the brazing repair material, a content ratio of the Ni-base molten alloy powder is 30 to 90 mass %.

11. The damage-repairing method of the transition piece according to claim 1,
wherein, in the diffusion brazing step, the diffusion heat treatment is performed under vacuum.

12. The damage-repairing method of the transition piece according to claim 2,
wherein, in the diffusion brazing step, the diffusion heat treatment is performed under vacuum.

13. The damage-repairing method of the transition piece according to claim 3,
wherein, in the diffusion brazing step, the diffusion heat treatment is performed under vacuum.

14. A transition piece whose damage has been repaired by the damage-repairing method of the transition piece according to claim 1.

15. A transition piece whose damage has been repaired by the damage-repairing method of the transition piece according to claim 2.

16. A transition piece whose damage has been repaired by the damage-repairing method of the transition piece according to claim 3.

* * * * *